(12) United States Patent
Kudlacz et al.

(10) Patent No.: US 6,880,210 B2
(45) Date of Patent: Apr. 19, 2005

(54) STRAP CLIP FOR HANGING PIPING AND DUCTWORK

(76) Inventors: Chris Kudlacz, 7708 Lakeview, Ralston, NE (US) 68127; Charles W. Schlote, 8020 Seymour St., Ralston, NE (US) 68127

( * ) Notice: Subject to any disclaimer, the term of this patent is extended or adjusted under 35 U.S.C. 154(b) by 0 days.

(21) Appl. No.: 10/607,430

(22) Filed: Jun. 26, 2003

(65) Prior Publication Data

US 2004/0000037 A1 Jan. 1, 2004

Related U.S. Application Data

(60) Provisional application No. 60/392,414, filed on Jun. 28, 2002.

(51) Int. Cl.[7] .............................. F16L 3/00; A43C 1/00
(52) U.S. Cl. ............................ 24/570; 24/68 F; 248/59
(58) Field of Search ................................ 24/68 E, 68 F, 24/570, 129 B, 563, 19, 16 R, 32, 31 R, 35, 114.5, 169, 198, 481, 482; 248/58, 59, 60, 61, 64, 65, 70, 74.3, 74.2, 74.5

(56) References Cited

U.S. PATENT DOCUMENTS

| | | | | |
|---|---|---|---|---|
| 1,289,822 A | * | 12/1918 | Langdon | 248/60 |
| 1,439,265 A | * | 12/1922 | Gerrish | 24/35 |
| 1,472,890 A | * | 11/1923 | Shaw | 24/35 |
| 1,579,419 A | * | 4/1926 | Tomkinson | 248/59 |
| 3,415,473 A | * | 12/1968 | Ollen | 248/59 |
| 4,574,434 A | * | 3/1986 | Shupe et al. | 24/16 PB |
| 4,637,099 A | * | 1/1987 | Kasai | 24/169 |
| 6,553,632 B1 | * | 4/2003 | Brumpton | 24/68 E |

\* cited by examiner

*Primary Examiner*—Robert J. Sandy
(74) *Attorney, Agent, or Firm*—Adam H. Jacobs

(57) ABSTRACT

A strap clip for hanging piping and ductwork includes a generally inverted T-shaped clip body having a generally upright leg having an upright leg transverse slot formed therein adjacent the upper end of the generally upright leg and a first lower arm extending generally perpendicular to the generally upright leg adjacent the lower end of the generally upright leg. A second lower arm extends downward and outwards adjacent the lower end of the generally upright leg opposite the first lower arm. A third lower arm extends generally perpendicular to the upright leg generally adjacent the second lower arm. Each of the first lower arm, second lower arm and third lower arm each include a transverse slot formed therein extending generally parallel with the upright leg transverse slot. The supporting strap would be extended through the transverse slots and around the ductwork or piping to mount it on the strap.

15 Claims, 5 Drawing Sheets

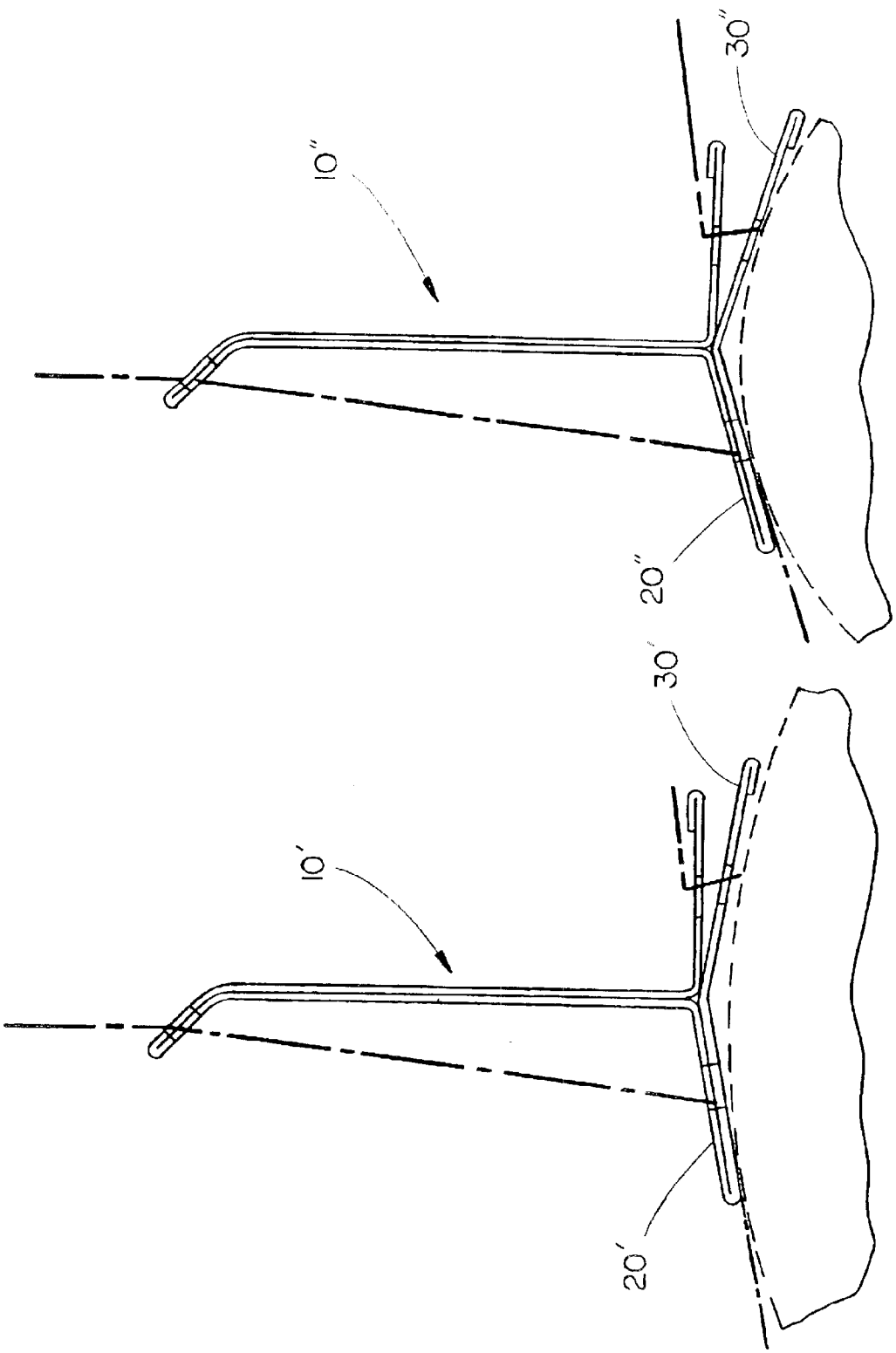

STRAP CLIP FOR HANGING PIPING AND DUCTWORK

CROSS-REFERENCE TO RELATED PROVISIONAL APPLICATION

This application claims priority to the filing date of related provisional patent application Ser. No. 60/392,414 filed Jun. 28, 2002.

BACKGROUND OF THE INVENTION

1. Technical Field

The present invention relates to clips for hanging ductwork and piping and, more particularly, to a generally inverted T-shaped clip having an upright leg with a transverse slot formed adjacent to the upper end thereof, a first lower arm extending generally perpendicular to the upright leg adjacent to the lower end thereof, the first lower arm having a transverse slot formed therein, a second lower arm extending downward and outwards from the upright leg opposite the first lower arm and a third lower arm extending generally perpendicular to the upright leg on the same side as the second lower arm, each of the second and third lower arms including a transverse slot formed therein.

2. Description of the Prior Art

A common method of construction of buildings involves the use of suspended ceilings to provide an appearance of a solid overhead structure which conceals the electrical, plumbing, and air-conditioning lines which run overhead. In fact, the majority of buildings constructed at the present time utilize one form or another of this type of construction method and therefore it is a vital element of this type of construction to properly suspend piping and ductwork from the ceiling to prevent the overhead lines from falling from their suspended location. At the present time, ductwork and piping are suspended from a ceiling structure by hanging a plurality of metal straps downwards from the ceiling structure, wrapping a section of the strapping around the piping or ductwork to be suspended, and attaching the end of the strapping to the depending strap section mounted to the ceiling structure thus suspending the piping therefrom. FIGS. 3 and 4 show examples of the prior art, specifically two of the most common methods by which piping and ductwork are suspended from ceiling structures, and it should be noted that only very rarely in failure situations is it found that the point of connection of the strap to the ceiling structure is where the failure of suspension took place. Rather, due to the forces exerted on the screws which connect the strap section wrapped around the piping to the depending strap section, it is this point of connection which is often the failure location. There is therefore a need for a more secure device and system for suspending piping and ductwork from a ceiling structure.

Another problem encountered in the prior art is that, due to the sheer number of straps which must be attached to the ceiling structure, it is common for the straps to be attached to the ceiling structure and left in place waiting for the piping or ductwork to be suspended to be attached thereto. However, if the strap is not of sufficient length to extend around the piping or ductwork, the strap must be removed and replaced with one of sufficient length. In the industry, it is quite common for this to occur due to the relative inexperience of some of the individuals working on a job site. This results in an increase in time expended in the erection of the building structure and, given a sufficient number of incidences, can result in costly penalties being paid by the contractor due to the extended length of time necessary to complete the project. There is therefore a need for a piping and ductwork hanging device and system which addresses and corrects this problem.

Therefore, an object of the present invention is to provide an improved strap clip for hanging piping and ductwork.

Another object of the present invention is to provide an improved strap clip for hanging piping and ductwork which will quickly and safely mount piping or ductwork to a support strap depending from a ceiling allowing the piping or ductwork to be supported by the strap.

Another object of the present invention is to provide an improved strap clip for hanging piping and ductwork which is generally inverted T-shaped.

Another object of the present invention is to provide an improved strap clip for hanging piping and ductwork which includes an upright leg with a transverse slot formed adjacent to the upper end thereof, a first lower arm extending generally perpendicular to the upright leg adjacent to the lower end thereof, the first lower arm having a transverse slot formed therein, a second lower arm extending downward and outwards from the upright leg opposite the first lower arm and a third lower arm extending generally perpendicular to the upright leg on the same side as the second lower arm, each of the second and third lower arms including a transverse slot formed therein.

Another object of the present invention is to provide an improved strap clip for hanging piping and ductwork which will generally eliminate the problem of mismeasurement of strap length commonly encountered during the suspending of piping and ductwork from ceiling structures.

Finally, an object of the present invention is to provide a strap clip for hanging piping and ductwork which is relatively simple and inexpensive to construct and is safe, simple and efficient in use.

SUMMARY OF THE INVENTION

The present invention provides a strap clip for hanging piping and ductwork having a generally inverted T-shaped clip body. The generally inverted T-shaped clip body includes a generally upright leg having an upright leg transverse slot formed therein adjacent the upper end of the generally upright leg and a first lower arm extending generally perpendicular to the generally upright leg adjacent the lower end of the generally upright leg, the first lower arm having a first lower arm transverse slot formed therein extending generally parallel with the upright leg transverse slot. A second lower arm extends downward and outwards adjacent the lower end of the generally upright leg opposite the first lower arm, the second lower arm having a second lower arm transverse slot formed therein extending generally parallel with the upright leg transverse slot. A third lower arm extends generally perpendicular to the upright leg generally adjacent the second lower arm, the third lower arm having a third lower arm transverse slot formed therein extending generally parallel with the upright leg transverse slot. The strap for supporting the ductwork or piping would be extended through the various transverse slots in the manner described below in order to secure the strap clip on the strap and thus securely, safely and rapidly mount the ductwork or piping on the strap.

It is thus seen that the present invention provides a substantial improvement over those inventions found in the prior art. For example, the design of the present invention permits the user to quickly and easily secure the ductwork or piping at the specified height on the support strap without requiring the numerous securement steps which are mandated by many of the devices found in the prior art, particularly the standard methods of securement described previously in this disclosure. Furthermore, as the present invention is relatively simple in design and manufacture, the cost for each unit is kept low which will enable the cost-effective use of the present invention, thus providing a safe and efficient improved alternative to presently available methods and devices for mounting and securing piping and ductwork on support straps. Finally, because the present invention does not rely on only a single point of securement of the strap to the piping or ductwork, there is far less chance of the piping or ductwork disengaging from the strap and plummeting downwards to cause damage to persons and possessions positioned beneath the suspended piping or ductwork. The present invention thus provides a substantial improvement over the prior art.

BRIEF DESCRIPTION OF THE DRAWINGS

FIGS. 6 and 7 illustrate how the arms of the present invention may be angled to accommodate various sizes of pipe and ductwork.

DESCRIPTION OF THE PREFERRED EMBODIMENT

Figure 1:
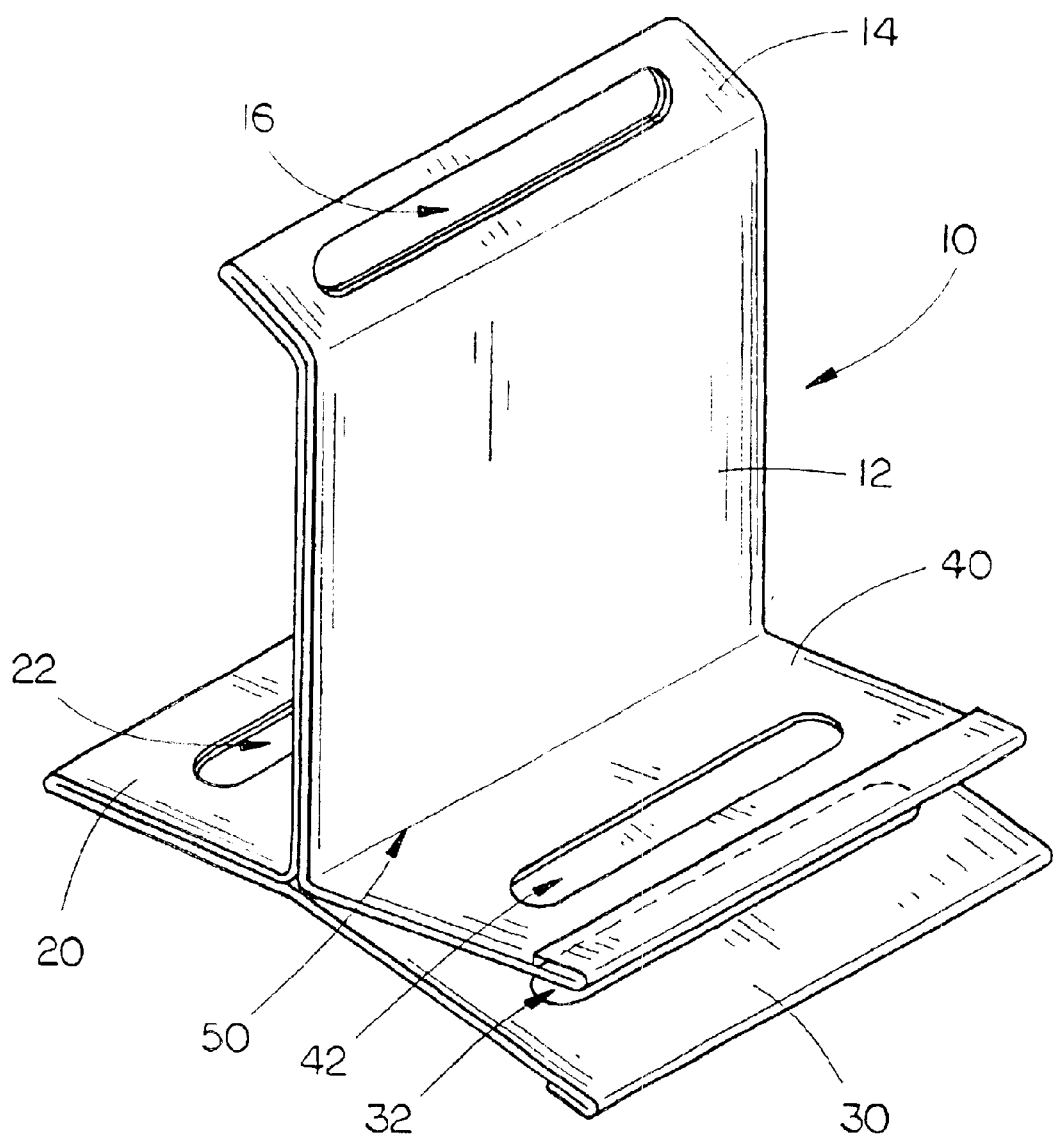
FIG. 1 is a perspective view of the present invention showing the elements thereof.
Figure 2:
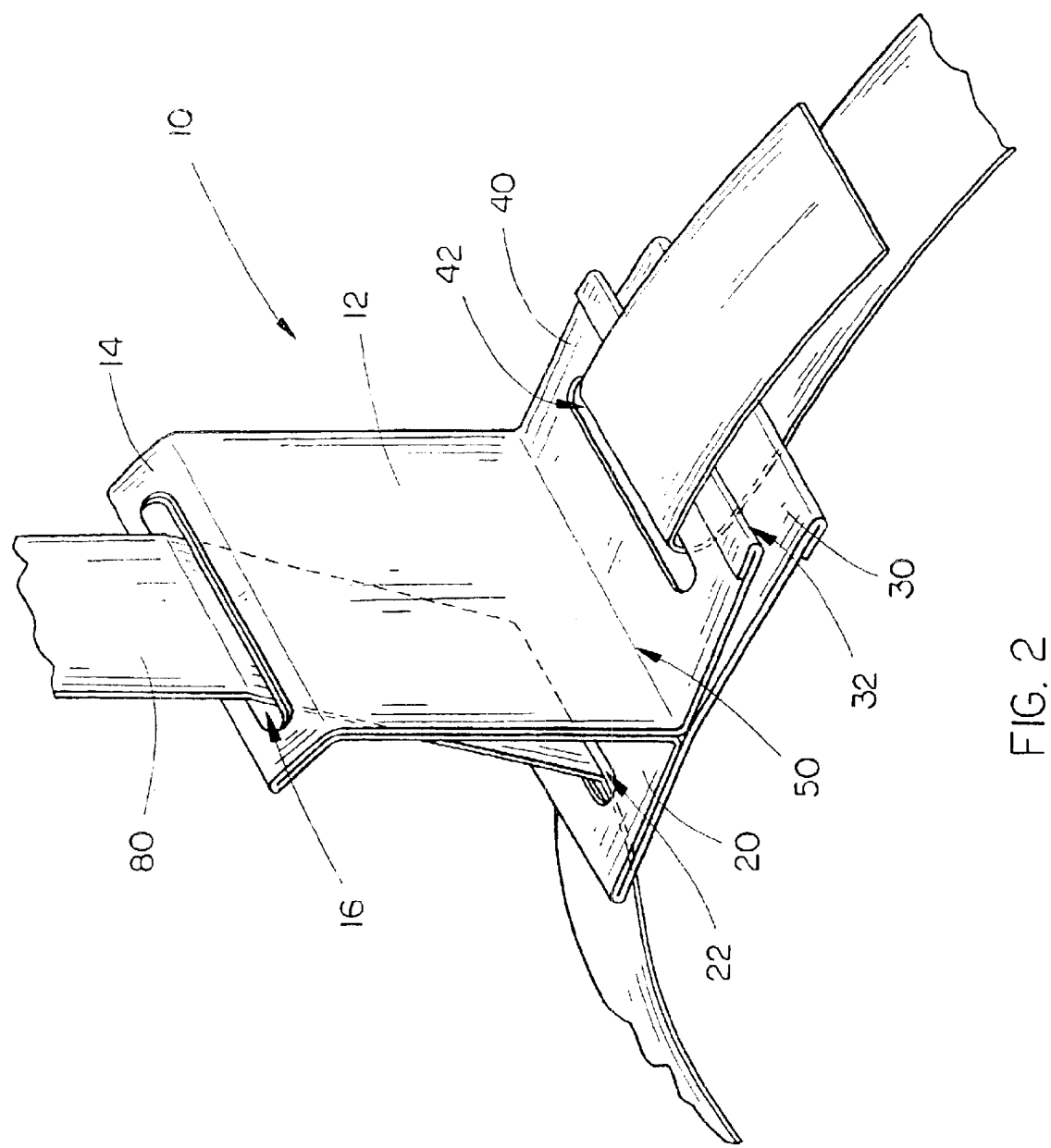
FIG. 2 is a perspective view of the clip of the present invention showing how the support band for the ductwork or piping extends through the clip.
Figure 4:
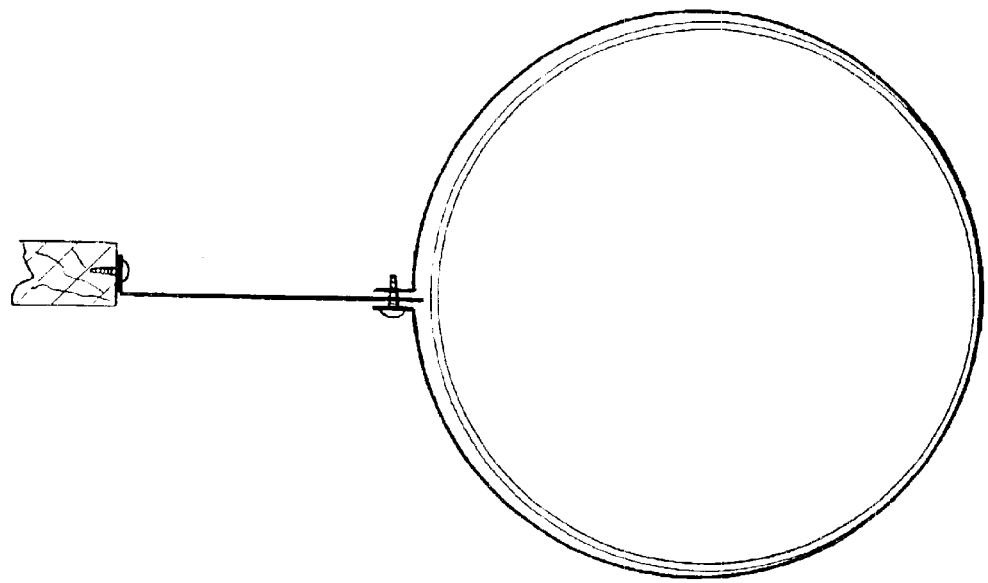
FIGS. 3 and 4 exhibit the prior art which the present invention is designed to improve upon.
Figure 3:
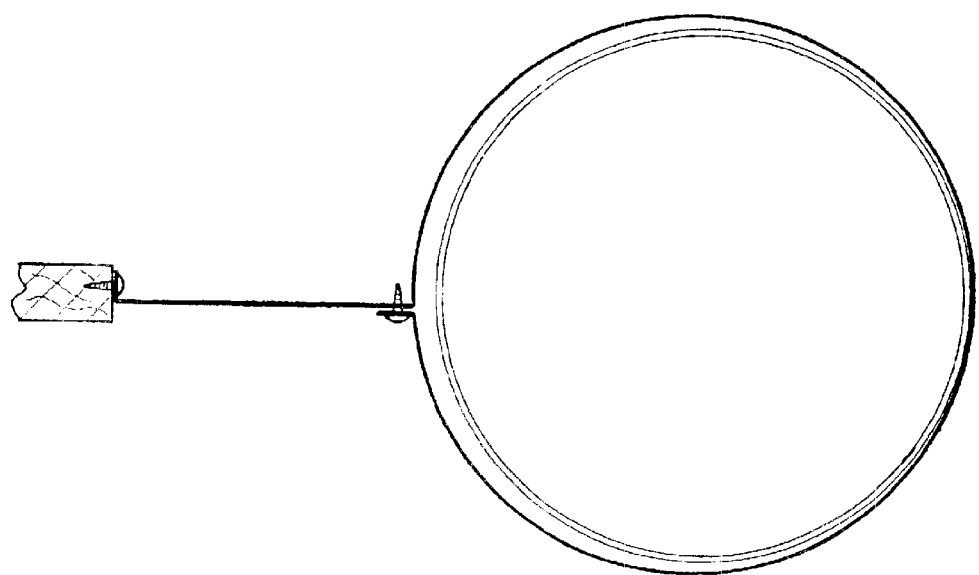
Figure 5:
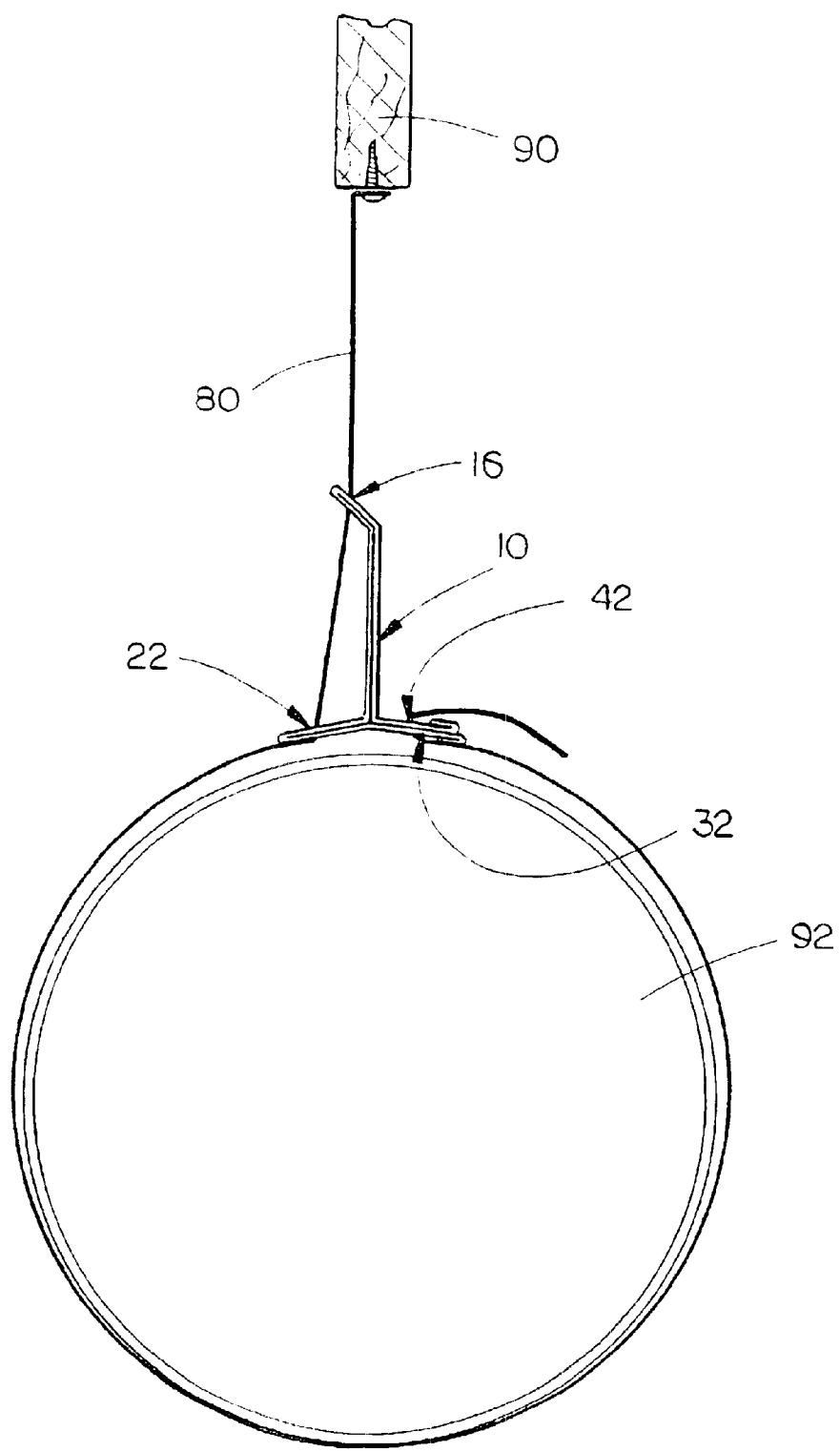
FIG. 5 is a side elevational view of the clip of the present invention supporting a section of pipe.

The strap clip 10 for supporting piping and ductwork is shown best in FIGS. 1, 2, and 5 as having a generally inverted T-shape with an upright leg 12 extending generally vertically, the upright leg 12 having a height of approximately one to three inches and a width of approximately one to three inches. The upper portion of upright leg 12 is bent to form an angled flap 14, as shown best in FIG. 1, the angled flap 14 having a height of approximately one quarter to one-half an inch and being angled from vertical between 10 degrees and 90 degrees in the preferred embodiment. Angled flap 14 further includes an upper transverse slot 16 formed extending therethrough, the upper transverse slot 16 having a width of approximately one to two and three quarters inches and a height of approximately one-sixteenth of an inch to one-quarter of an inch (1/16" to 1/4"). The upper transverse slot 16 is adapted to receive a supporting strap 80 therethrough, and the angle of angled flap 14 allows for frictional contact of the edges of first transverse slot 16 with the strap 80 so that the strap clip 10 may be placed on the strap 80 and be frictionally retained thereon prior to final installation of the strap clip 10. It should be noted that the straps 80 which are used in the industry are commonly formed of strip steel having a gauge of between 14 and 20 and a width of approximately one to one and a half inches (1" to 1½"), although the exact size of the strap 80 is not critical to the present invention which is designed to function with straps of various dimensions.

Extending generally perpendicular to and outwards from the base of upright leg 12 is first lower arm 20 which, in the preferred embodiment, would have a width approximately equal to the width of upright leg 12, a length of approximately one-half inch to one and a half inches (½ to 1½"), and would extend generally perpendicular to or angled slightly downwards from perpendicular as related to the upright leg 12. Formed in first lower arm 20 is first lower transverse slot 22 which extends generally parallel with upper transverse slot 16 and would have approximately the same dimensions as described in connection with upper transverse slot 16. It is preferred, however, that first lower transverse slot 22 be formed at approximately the mid-point of first lower arm 20, such that first lower transverse slot 22 is vertically offset from upper transverse slot 16, as shown best in FIGS. 1 and 2. The vertical offset of upper transverse slot 16 and first lower transverse slot 22 enhances the frictional engagement of strap 80 such that the strap clip 10 may be placed on strap 80 with strap 80 extending through upper transverse slot 16 and first lower transverse slot 22 so that strap clip 10 is frictionally supported on strap 80. This permits a user of the invention to place the strap clip 10 being used in the support of the piping or ductwork in the desired location prior to final installation so that the work crew following the clip installer to do the final installation knows precisely at what height to suspend the piping or ductwork.

Extending from the base of upright leg 12 in the opposite direction as first lower arm 20 is a second lower arm 30 which would have a length approximately one-eighth inch to one-half inch (⅛" to 1½") longer than the length of first lower arm 20 and a width approximately equal to the width of upright leg 12. In the preferred embodiment, the second lower arm would extend outwards and downwards from upright leg 12 at an angle slightly greater than the angle formed between upright leg 12 and first lower arm 20, as shown best in FIGS. 1 and 5. Second lower arm 30 would also include a second lower transverse slot 32 having approximately the same dimensions as upper transverse slot 16 and first lower transverse slot 22 and positioned at approximately the mid-point of the length of second lower arm 30.

Finally, a third lower arm 40 extends outwards generally perpendicular to upright leg 12 adjacent to the base thereof on the same side of upright leg 12 as second lower arm 30, as shown best in FIG. 1. In the preferred embodiment, third lower arm 40 would have a length approximately equal to the length of first lower arm 20 and a width approximately equal to the width of upright leg 12. It is further preferred that third lower arm 40 be connected to upright leg 12 along a semi-flexible hinge 50 such that third lower arm 40 may move downwards slightly to engage second lower arm 30 and be generally parallel therewith upon force being applied to third lower arm 40 in a downwards direction. Third lower arm 40 also includes a third lower transverse slot 42 having approximately the same dimensions as first and second lower transverse slots 22 and 32, with the slot positioned at approximately the mid-point of the length of third lower arm 40, as shown best in FIGS. 1 and 2.

It is preferred that the strap clip 10 of the present invention be constructed of sheet metal cut into a single long strip and folded to form the various elements as described above, as understood by those skilled in the art of metal component manufacturing techniques. The resulting folded strap clip 10 would then be spot-welded in several locations thereon to ensure that the clip 10 will remain in its desired form. It is believed that this construction method will be the most efficient and cost-effective, although it should be noted that various other construction methods and materials may be used which accomplish the same result.

The strap clip 10 is used to secure piping and ductwork in the following manner. A section of strap 80, seen best in FIGS. 2 and 5, extends downwards from a ceiling structure 90 prior to supporting a section of pipe 92 thereon. The strap clip 10 of the present invention is placed on the strap 80 with the end of strap 80 being threaded through upper transverse slot 16 in angled flap of upright leg 12 downwards through first lower transverse slot 22 in first lower arm 20. The strap clip 10 may be moved upwards or downwards on the strap 80 until the proper location for the support of the pipe 92 is found. At this point, the strap 80 is bent sideways underneath first lower transverse slot 22, thus forming a fold which supports the strap clip 10 at the determined appropriate height. Alternatively, the clip 10 can be left on the strap 80 in frictional securement thereon due to the contact between strap 80 and the upper and first lower transverse slots 16 and 22 should it be determined that the strap 80 should not be bent at that time. The pipe 92 is then positioned underneath the strap clip 10 and the strap 80 is extended around the pipe 92, as shown best in FIG. 5. The end of the strap 80 is then extended upwards through second lower transverse slot 32 in second lower arm 30 and upwards again through the third lower transverse slot 42 in third lower arm 40. The strap 80 is then pulled away from upright leg 12 and simultaneously pulled downwards along the curved section of the strap 80 adjacent pipe 92. This outwards and downwards pulling of the strap 80 pulls the strap tight around pipe 92 and in addition, immediately prior to reaching the desired point of securement, pulls third lower arm 40 downwards into contact with second lower arm 30, providing further frictional securement of the strap 80 between the second and third lower transverse slots 32 and 42 due to the offset position of those slots 32 and 42. Furthermore, due to the semi-flexible hinge connection 50 of third lower arm 40 to upright leg 12, release of the strap 80 at this point returns third lower arm 40 to its original position should adjustment of the positioning of pipe 92 be necessary. Otherwise, the excess length of strap 80 is removed and the strap end is secured either to the pipe 92 or to the strap section adjacent pipe 92, or the end of the strap 80 may be secured to any appropriate location. It is thus seen how quickly, efficiently and simply the pipe 92 is mounted on strap 80, particularly when compared with the laborious procedures mandated by the prior art.

Finally, FIGS. 6 and 7 illustrate alternative embodiments of the strap clip 10' and 10" of the present invention in which the first lower arm 20' and 20" and second lower arm 30' and 30" are bent at slightly different angles to accommodate pipe of various diameters. Likewise, the first and second lower arms 20' and 20" and 30' and 30" may be bent to be generally horizontal to accommodate ductwork or the like, yet still provide the same swift and simple installation of the piping or ductwork on the hanging strap. Finally, although it should be noted that the current state of the art for hanging rectangular ductwork requires the use of two strap hangers according to code, it is believed that the present invention provides a method and apparatus for hanging ductwork which is at least as safe as the dual strap method and which is far more efficient as was described above and therefore may be used for such applications in the future.

It is to be understood that numerous modifications, additions, and substitutions may be made to the present invention which fall within the intended broad scope of the above description. For example, the precise materials and methods of manufacture of the present invention are not critical to the present invention so long as the functional characteristics of the invention are maintained along with the general structure of the invention. Also, the specific angles and position of elements used in the present invention are only critical to the extent that the functionality of the invention is maintained. Finally, it should be noted that, although the present invention has been described as including particular dimensions, modifications to those dimensions are contemplated and made a part of this disclosure so long as the invention functions according to the systems and methods described above.

There has thus been shown and described a strap clip for supporting piping and ductwork which accomplishes at least all of its intended objectives.

We claim:

1. A strap clip for hanging piping and ductwork comprises:
   a generally inverted T-shaped clip body including;
   a generally upright leg having an upright leg transverse slot formed therein adjacent an upper portion of said generally upright leg;
   a first lower arm extending outwards from said generally upright leg adjacent a lower end of said generally upright leg, said first lower arm having a first lower arm transverse slot formed therein extending generally parallel with said upright leg transverse slot;
   a second lower arm extending downward and outwards adjacent said lower end of said generally upright leg opposite said first lower arm, said second lower arm having a second lower arm transverse slot formed therein extending generally parallel with said upright leg transverse slot; and
   a third lower arm extending outwards from said upright leg generally adjacent and above said second lower arm, said third lower arm having a third lower arm transverse slot formed therein extending generally parallel with said upright leg transverse slot.

2. The strap clip for hanging piping and ductwork of claim 1 wherein said generally inverted T-shaped clip body is constructed from sheet metal.

3. The strap clip for hanging piping and ductwork of claim 1 wherein said upper portion of said generally upright leg is angled forming an angled flap, said angled flap being angled from the lower portion of said generally upright leg between ten (10) degrees and ninety (90) degrees, said upright leg transverse slot formed in said angled flap of said generally upright leg.

4. The strap clip for hanging piping and ductwork of claim 1 wherein said first and second lower arms extend generally parallel with each other.

5. The strap clip for hanging piping and ductwork of claim 1 wherein a connection of said third lower arm to said generally upright leg comprises a semi-flexible hinge connection such that said third lower arm is pivotable downwards to contact and engage said second lower arm.

6. The strap clip for hanging piping and ductwork of claim 1 wherein said first lower arm extends generally perpendicularly outwards from said upright leg.

7. The strap clip for banging piping and ductwork of claim 1 wherein said third lower arm extends generally perpendicularly outwards from said upright leg.

8. A method of mounting piping and ductwork on a supporting strap depending from a ceiling structure comprising the steps:
   providing a strap clip having a generally inverted T-shaped clip body including a generally upright leg having an upright leg transverse slot formed therein, a first lower arm extending outwards from said generally upright leg adjacent the lower end of said generally upright leg, said first lower arm having a first lower arm transverse slot formed therein extending generally parallel with said upright leg transverse slot, a second lower arm extending downward and outwards adjacent said lower end of said generally upright leg opposite said first lower arm, said second lower arm having a second lower arm transverse slot formed therein extending generally parallel with said upright leg transverse slot and a third lower arm extending generally perpendicular to said upright leg generally adjacent said second lower arm, said third lower arm having a third lower arm transverse slot formed therein extending generally parallel with said upright leg transverse slot;

placing said strap clip on the supporting strap with the end of said supporting strap being threaded through said upright leg transverse slot of said generally upright leg;

threading said end of said supporting strap clip through said first lower arm transverse slot in said first lower arm;

adjusting the height of said strap clip on said supporting strap to the desired height for support of piping and ductwork;

extending said supporting strap around the piping and ductwork to be supported by said supporting strap;

threading an end of said supporting strap through said second lower arm transverse slot in said second lower arm;

threading said end of said supporting strap through said third lower arm transverse slot in said third lower arm;

tensioning said supporting strap outwards and downwards relative to said strap clip pulling said supporting strap tight around the piping and ductwork supported by said supporting strap; and pivoting said third lower arm downwards into contact with said second lower arm via said tensioning step such that said supporting strap is further frictionally secured between said second and third lower arm transverse slots and said third and second lower arms.

9. A strap clip for hanging piping and ductwork comprises:

a generally inverted T-shaped clip body including;

a generally upright leg having an upright leg transverse slot formed therein adjacent an upper portion of said generally upright leg, said upper portion of said generally upright leg being angled forming an angled flap, said angled flap being angled from the lower portion of said generally upright leg between ten (10) degrees and ninety (90) degrees, said upright leg transverse slot formed in said angled flap of said generally upright leg;

a first lower arm extending outwards from said generally upright leg adjacent a lower end of said generally upright leg, said first lower arm having a first lower arm transverse slot formed therein extending generally parallel with said upright leg transverse slot;

a second lower arm extending downward and outwards adjacent said lower end of said generally upright leg opposite said first lower arm, said second lower arm having a second lower arm transverse slot formed therein extending generally parallel with said upright leg transverse slot; and said upright leg transverse slot adapted to receive a supporting strap extended therethrough, said first lower arm transverse slot adapted to receive a supporting strap extended through said upright leg transverse slot into and through said first lower arm transverse slot, said second lower arm transverse slot adapted to receive a supporting strap extended through said first lower arm transverse slot and around piping and ductwork being supported by the supporting strap into and through said second lower arm transverse slot such that said strap clip is operative to secure piping and ductwork to a supporting strap depending from a ceiling structure.

10. The strap clip for hanging piping and ductwork of claim 9 wherein said generally inverted T-shaped clip body is constructed from sheet metal.

11. The strap clip for hanging piping and ductwork of claim 9 further comprising a third lower arm extending outwards from said upright leg generally adjacent and above said second lower arm, said third lower arm having a third lower arm transverse slot formed therein extending generally parallel with said upright leg transverse slot.

12. The strap clip for hanging piping and ductwork of claim 11 wherein a connection of said third lower arm to said generally upright leg comprises a semi-flexible hinge connection such that said third lower arm is pivotable downwards to contact and engage said second lower arm.

13. The strap clip for hanging piping and ductwork of claim 11 wherein said third lower arm extends generally perpendicularly outwards from said upright leg.

14. The strap clip for hanging piping and ductwork of claim 9 wherein said first and second lower arms extend generally parallel with each other.

15. The strap clip for hanging piping and ductwork of claim 9 wherein said first lower arm extends generally perpendicularly outwards from said upright leg.

* * * * *